United States Patent
Bergman et al.

(10) Patent No.: US 7,174,308 B2
(45) Date of Patent: Feb. 6, 2007

(54) METHOD AND SYSTEM OF ORDERING AND SELLING FOOD AT VENUES

(75) Inventors: Rick C. Bergman, 2321 E. River Rd., Grafton, WI (US) 53204; Kristian Larsen, Milwaukee, WI (US); Todd Dunsirn, Shorewood, WI (US)

(73) Assignee: Rick C. Bergman, Grafton, WI (US)

( * ) Notice: Subject to any disclaimer, the term of this patent is extended or adjusted under 35 U.S.C. 154(b) by 480 days.

(21) Appl. No.: 09/934,408

(22) Filed: Aug. 21, 2001

(65) Prior Publication Data

US 2002/0038259 A1   Mar. 28, 2002

Related U.S. Application Data

(60) Provisional application No. 60/226,647, filed on Aug. 21, 2000.

(51) Int. Cl.
G06F 17/60 (2006.01)
(52) U.S. Cl. .................................... 705/26
(58) Field of Classification Search .............. 705/26, 705/27
See application file for complete search history.

(56) References Cited

U.S. PATENT DOCUMENTS

| | | | |
|---|---|---|---|
| 4,415,065 A | 11/1983 | Sandstedt | |
| 4,530,067 A | 7/1985 | Dorr | |
| 4,553,222 A | 11/1985 | Kurland et al. | |
| 4,777,488 A | 10/1988 | Carlman, Jr. et al. | |
| 4,797,818 A | 1/1989 | Cotter | |
| 5,003,472 A | 3/1991 | Perrill et al. | |
| 5,128,862 A | 7/1992 | Mueller | |
| 5,220,677 A | 6/1993 | Brooks | |
| 5,235,509 A | 8/1993 | Mueller et al. | |
| 5,504,589 A | 4/1996 | Montague et al. | |
| 5,590,407 A | 12/1996 | Ishikawa et al. | |
| 5,838,798 A | 11/1998 | Stevens, III | |
| 5,845,263 A | 12/1998 | Camaisa et al. | |
| 5,912,743 A | 6/1999 | Kinebuchi et al. | |

(Continued)

FOREIGN PATENT DOCUMENTS

JP    04-169966    *    6/1992

OTHER PUBLICATIONS

Cavanaugh, Susan "Football concessions score with upscale, classic items", Nation's Restaurant News, vol. 28, No. 35, Sep. 5, 1994.*

(Continued)

*Primary Examiner*—Jeffrey A. Smith
*Assistant Examiner*—Naeem Haq
(74) *Attorney, Agent, or Firm*—Michael Best & Friedrich LLP

(57) ABSTRACT

A method and system for ordering and selling products at a venue. The invention provides a first wireless communications device associated with an attendee operable to generate an order. The order information from the attendee is communicated from the first communications device to a server. The server is queried by vendor workstations at a venue. Orders are then displayed at the vendor workstations and fulfilled by vendors who deliver ordered items to the attendee at the attendee location.

12 Claims, 15 Drawing Sheets

U.S. PATENT DOCUMENTS

| | | | | |
|---|---|---|---|---|
| 5,991,749 | A | * | 11/1999 | Morrill, Jr. .................. 705/44 |
| 6,473,739 | B1 | * | 10/2002 | Showghi et al. .............. 705/26 |
| 6,754,636 | B1 | * | 6/2004 | Walker et al. ................ 705/26 |
| 2001/0018660 | A1 | * | 8/2001 | Sehr .............................. 705/5 |

OTHER PUBLICATIONS

Chris Jenkins, ChoiceSeat Gives Fans Stats, Replays and Nachos Orders, USA Today, Nov. 14, 2000, Arlington, Virginia.

* cited by examiner

METHOD AND SYSTEM OF ORDERING AND SELLING FOOD AT VENUES

RELATED APPLICATION

This application claims priority to U.S. provisional patent application Ser. No. 60/226,647, filed Aug. 21, 2000.

BACKGROUND OF THE INVENTION

The present invention relates to methods and systems for ordering and selling food, beverages, souvenirs, clothing, and other items at sports venues, concerts, and the like. More particularly, it relates to ordering and selling such items using hand-held devices to take product orders that are then communicated to vendors who sell and deliver the ordered items to the ordering individual.

Anyone who has been to a professional baseball or football game or similar event has witnessed the practice of vendors who walk throughout the event stadium selling food, beverages, and other items (collectively "products") to fans at their seats in the stands. As is known, when a fan or event attendee wishes to purchase an item that person must attract the attention of the vendor selling the item the attendee wishes to purchase. Usually, this requires waiting until a particular vendor is in close proximity to the attendee and then calling out or waving to the vendor. Once the vendor's attention is gained, he or she walks to a location near the attendee and conducts the sales transaction.

Venue vendors provide a convenience to attendees of the event by permitting the attendees to purchase items without leaving their seats. The sales generated by the vendors provide a significant source of revenue for the owner or operator of the venue. Nevertheless, there are drawbacks to the present system of ordering and selling products at stadiums and similar venues.

First, vendors are often assigned sections of the stadium or venue to sell products. Sometimes this results in attendees of certain sections not being able to purchases specific products from their seats. Second, attendees are not always successful in gaining the attention of a vendor. As a result, attendees often must wait until the vendor returns to the attendees' section of the venue before obtaining the products desired. In other instances, the attendee either fails to purchase a product or purchases a product that is the attendees' second or third choice.

SUMMARY OF THE INVENTION

Accordingly, there is a need for an improved system and method of ordering and selling products at venues. The invention provides a first wireless communications device associated with an attendee operable to generate an order including attendee location information, product ordering information, and payment information. The order information from the attendee is communicated from the first communications device to a device associated with a vendor. The vendor device is operable to receive a message concerning the order and may communicate a response message indicating acceptance or rejection of the order. The invention may include an order station that receives orders from all of the attendees at the venue, performs preliminary processing of those orders, and generates the message to the second communications device. However, the first and second communications devices may communicate directly with one another.

The invention also provides a method of ordering and selling products at a venue. The method includes generating a product order on a wireless communications device associated with an attendee. The order includes attendee location information, product ordering information, and payment information. The method also includes transmitting a message concerning the order to a vendor at the venue and receiving the message on a second wireless communications device associated with the vendor. A response message may be generated with the second wireless communications device indicating acceptance or rejection of the order.

In another embodiment, the invention provides a system for ordering items available at a venue. The system includes a display board, a network, and a first computer device coupled to the network. The first computer device hosts a site and includes a database of users. The database of users includes information regarding a user's seating location at the venue. One or more wireless communication devices are coupled to the first computer device via the network. Each wireless communication device is operable to generate an order for items available at the venue and transmit the order to the first computer device. In some cases the wireless devices interact with a voice command processor which transmits orders to the first processing device.

The system also includes venue computer device coupled to the first computer device via the network and one or more vendor stations coupled to the vendor computer device. The vendor devices are operable to query the first computer device and display orders on a monitor.

The invention also provides a method of ordering items at a venue. The method includes providing ordering information to venue attendees regarding items available for order at the venue and how to order such items from the venue seating locations of the venue attendees. The method also includes registering venue attendees by querying venue attendees for personal information, venue information, and payment information. The venue attendees generate orders and those orders are stored on a first computer device. The first computer device is queried on a periodic basis to retrieve the orders and the orders are displayed on one or more venue stations located at the venue. Orders displayed on the one or more venue stations are fulfilled.

As is apparent from the above, it is an advantage of the present invention to provide a method and system of ordering and selling products at a venue. Other features and advantages of the present invention will become apparent by consideration of the detailed description and accompanying drawings.

DETAILED DESCRIPTION

Figure 1:
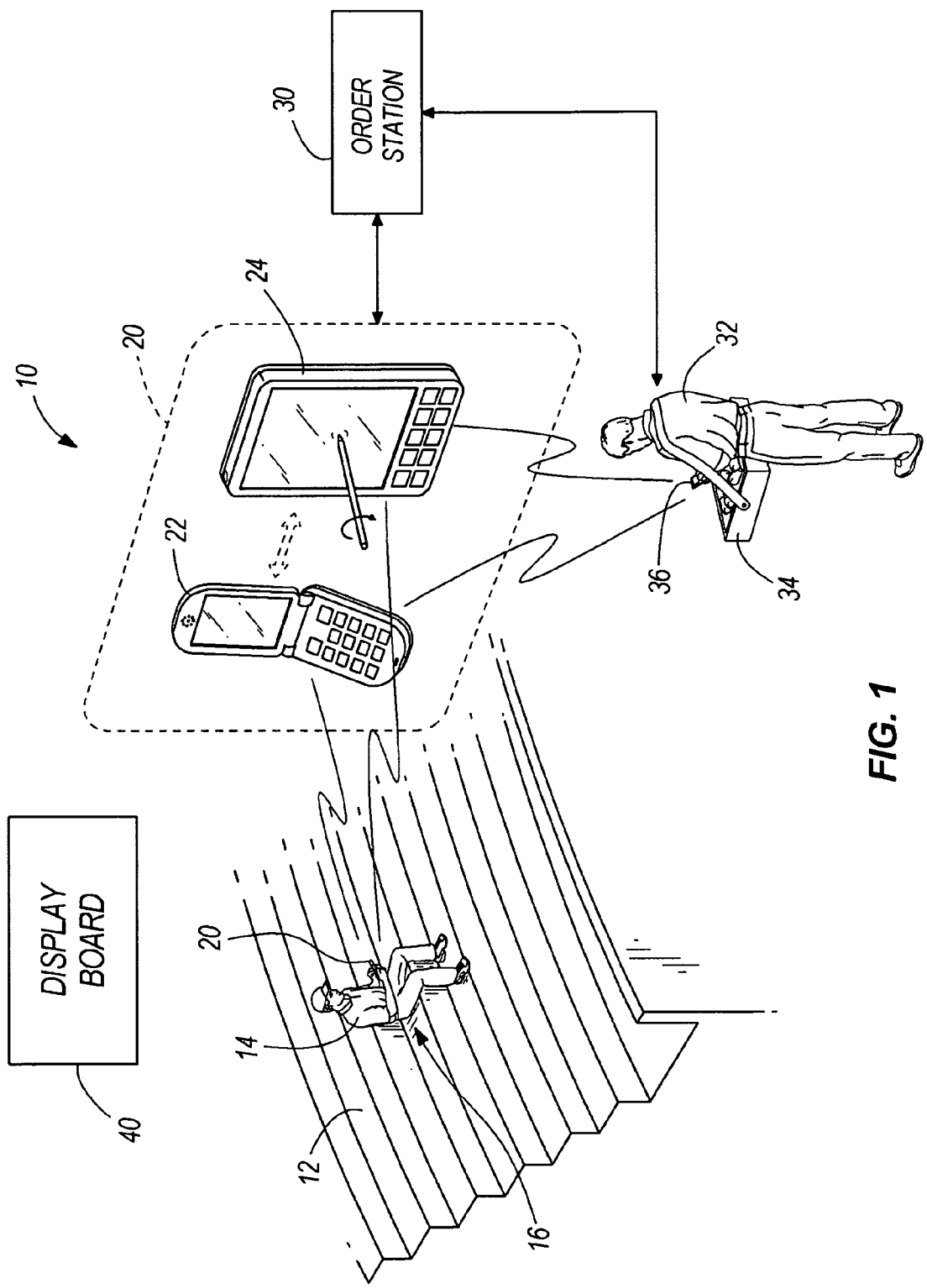
FIG. 1 is an illustration of a system of one embodiment of the invention.

Before the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A system 10 of one embodiment of the invention is shown in FIG. 1. (FIGS. 1–6 illustrate one system where order information is communicated wirelessly to vendors and venue attendees can order items by accessing a site or communication channel they learn of once at the venue. FIGS. 7–15 illustrate another embodiment of the invention where attendees pre-register with a service site and vendors receive orders printed on paper. Various combinations of the features of these two embodiments may be made to create still other embodiments and would be apparent to those of ordinary skill in the art.) The system 10 is designed to be used at a venue such as a stadium 12 or similar location where venue attendees, such as a person 14, are located at a seating position 16. In many such venues, seating positions are assigned according to seat number, row number, and section. The person 14 carries a wireless communications device 20, such as a cellular phone 22, personal digital assistant ("PDA") 24 having a pointing device 26, or a similar portable communications device, including phones or devices that have radio frequency ("RF") communication capabilities.

As will be described in greater detail below, the person 14 uses the communications device 20 to create and send an order. In one embodiment, the order is communicated to an order station 30. The order station may be located within or near the venue. As will be explained in greater detail, the order station may communicate with one or more stadium or event vendors 32. Each vendor 32 has a product carrier or dispenser 34 and may have a communications device 36. The communications device 36 may be one of the devices mentioned above, such as the cellular phone 22, the PDA 24, or a similar device.

In one embodiment, the communication devices 20 and 36 communicate using Internet-based protocols. In such an embodiment, each device 20 and 36 runs an operating system capable of supporting a browser capable of reading information formatted using a set of tags, such as documents formatted using HTML-like languages. Preferably, order and other information is entered in the browser on the device 20 and then sent to the station 30 using Internet and web-based technologies. The information sent to the station is then communicated to the device 36. Order information is then displayed on the browser of the device 36. A response message may be similarly entered into a form on the browser of the device 36 by the vendor 32 and sent back to the order station 30. In addition to web-based technologies, text message paging and other technologies may be used to communicate between the devices 20 and 36, and in those applications where it is necessary, the order station 30.

Each vendor 32 and the order station 30 is assigned a unique communication channel which, by way of example, can take the form of an Internet address, a radio frequency channel, or a telephone number. In one embodiment of the invention, a display board 40, such as a stadium TV, scoreboard, or the like can be used to display the communication channels of the vendors and the order station at the venue, general instructions on how to order products at the venue, a menu of the items available for purchase at the venue, and a price list of those items. Alternatively, the communication channels may be cataloged on a web site, which may be accessed by venue attendees such as the person 16 using the device 20. Further, space in game programs may be used to provide user instructions, menus, and access points. As broadly used herein a "display board" includes all of the above items and equivalent mechanisms (such as the quick order card discussed below) of communicating menu, instruction, and/or access information to users.

Figure 2:
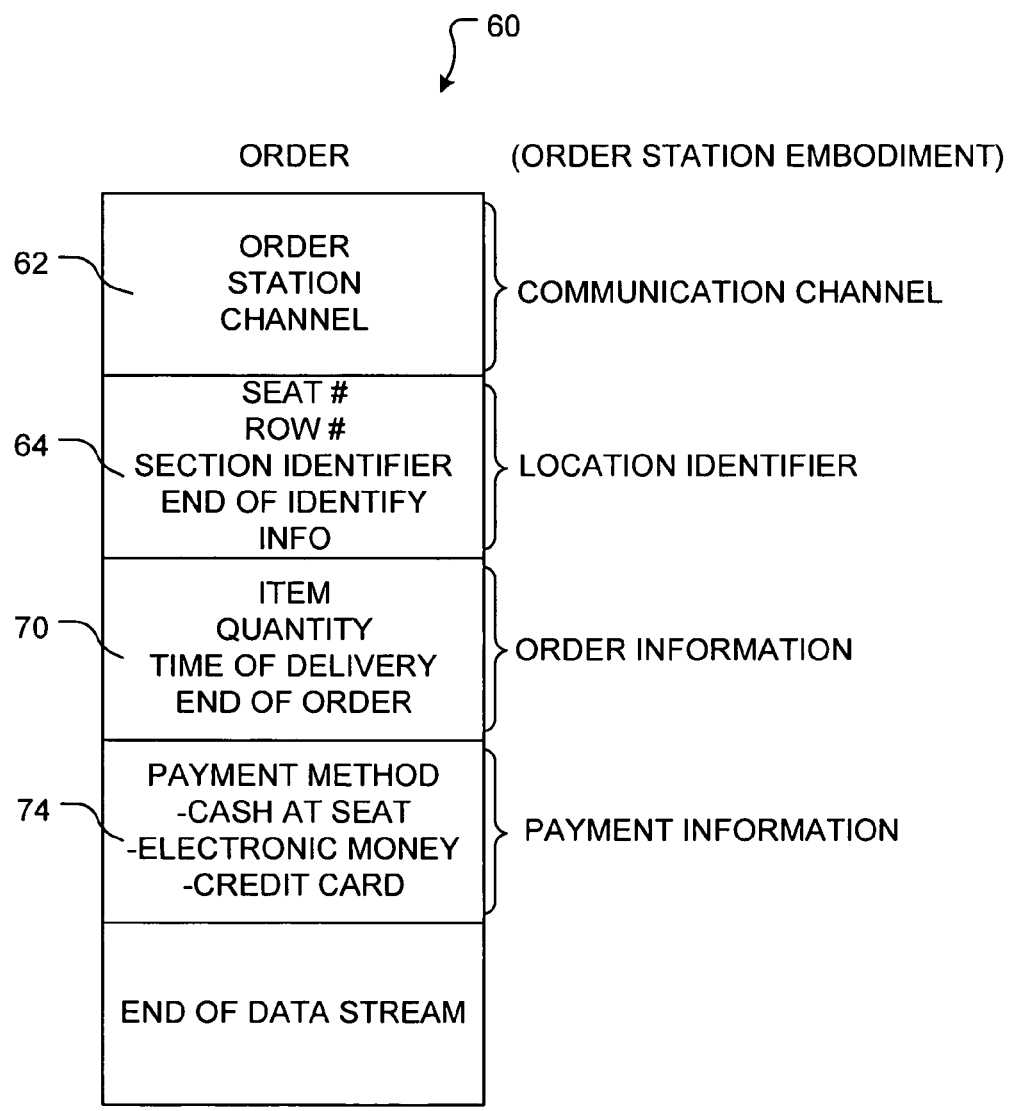
FIG. 2 is an illustration of the architecture of an order in one embodiment of the invention.
Figure 3:
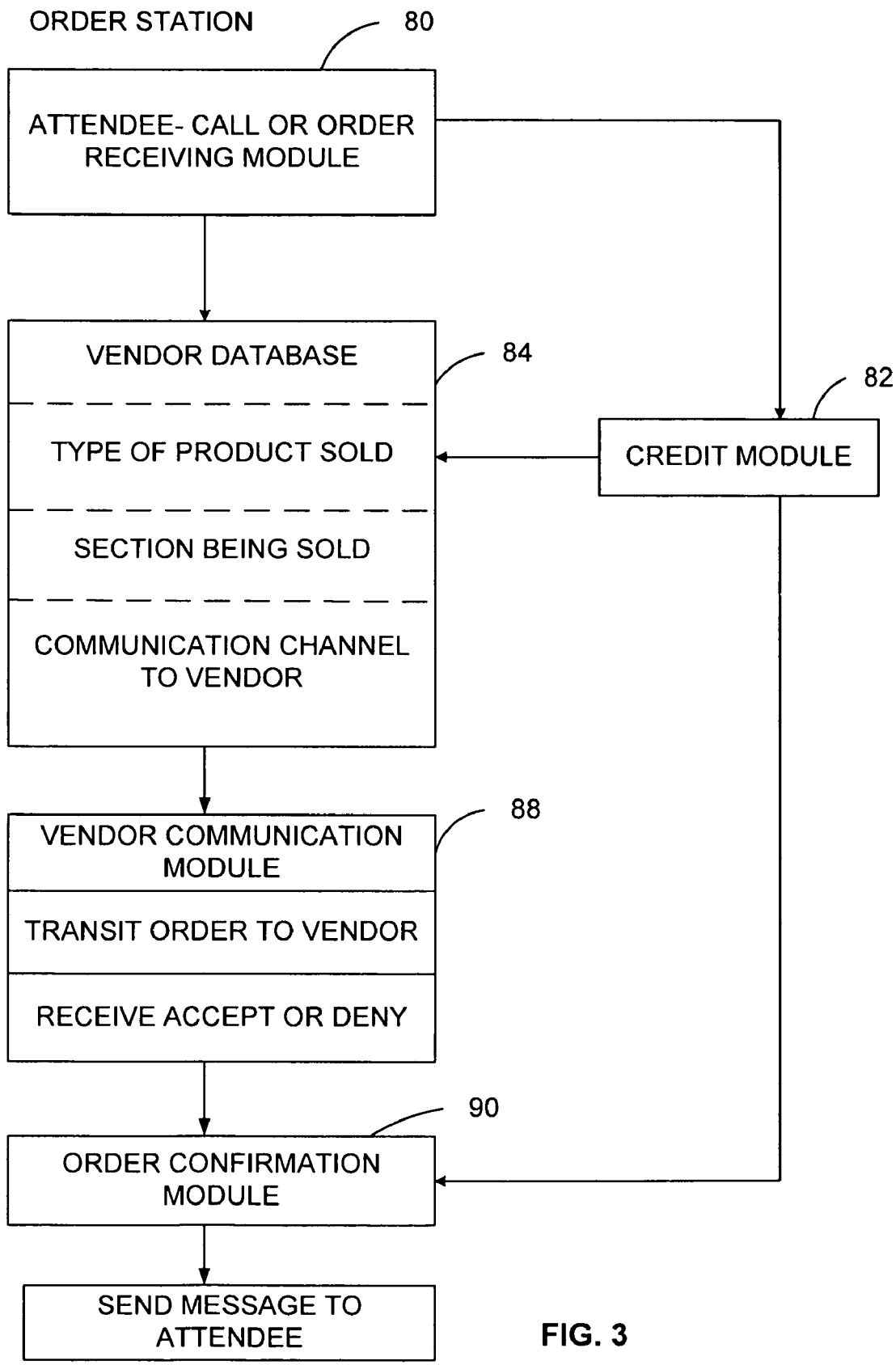
FIG. 3 is an illustration of the architecture of an order station.

To place an order, a venue attendee, such as the person 16, determines the communication channel over which orders must be sent by reviewing the display board 40. Once the person 16 has determined the appropriate communication channel, he or she constructs an order, such as an order 60 (FIG. 2). Depending on the communications architecture employed, the order 60 may include a communication channel 62, such as an Internet address. Whether or not it includes a communications channel 62, the order includes location identifying information 64, such as the seat number, row number, and section of the seating location 16 of the person 14. The order may optionally include a flag or break to indicate the end of the location identifying information 64. Following the location identifying information 64 is order information 70. The order information 70 includes an item description or identifier for each item ordered and the quantity of each item. Optionally, the order information 70 may include the price of each item 70 and a total amount for the items purchased. Item prices and order totals are provided in the Internet-based embodiment by initiating a communications session between the device 20 and the order station 30 as soon as the communication channel is opened by the device 20. A server (not shown) at the order station 30 reads the item identifiers and transmits a price for each back to the device 20. As each item identifier is entered in the browser on the device 20, the server also calculates a total for the order, which is transmitted back to the device 20 and displayed on the order form displayed on the browser. The order 60 may also include a desired delivery time, entered by the person 14 in a browser form or other input mechanism on the device 20. The delivery time is a time that the person 14 wishes the order to be delivered to the seating location 16. The order may also include an optional end of order flag or indicator.

Once all the order information 70 is entered, the person 14 enters payment information 74, which may include a payment method, such as cash at the seating location 16, electronic money accepted by or a credit account established at the venue, credit card data, or other payment methods. Finally, the order 60 may include an end of order information flag or indicator.

The order 60 is transmitted to the order station 30. As best seen by reference to FIG. 3, the order station 30 receives the order 60 in a receiving module 80. As noted above, it is possible that portions of the order are transmitted to the order station 30 as the order is created. Thus, the order need not be transmitted as an entire unit. The receiving module takes information from the order and passes it to other modules. If the order 60 includes payment information that indicates that the person 14 is paying by credit card, electronic money, or on account, that information is sent to a credit module 82 for verification and a credit check. The credit module may include or be a combination of known systems used to verify availability of electronic money and credit. If the credit check is positive, the order is processed in a vendor database module 84. Otherwise a reject message is generated and sent to an order confirmation module (discussed below).

The vendor database module 84 includes or has access to a database of the vendors working the venue, the type of products sold by each vendor, the particular area or areas of the venue being served by each vendor, and the communication channel for each vendor. Optionally, the order station may include an inventory record for each vendor to track the availability of items for sale as well as the number of items sold during an event at the venue.

The order station matches the order 60 to one or more vendors serving the seating location 16 of the person 14 with the desired item or items. If the order station maintains an inventory record for the vendors, the inventory of available items may also be checked to ensure that order information is given to a vendor with enough available items to fill the order. Regardless of whether inventory records are checked, the order 60 or a message related to the order is sent to the vendor 32 by a vendor communication module 88. The message related to the order 60 may be generated by the vendor communication module 88. The message may include all the order information or a portion thereof. What the message communicates to the vendor is that a person in an area served by the vendor desires to purchase products. Sending the message provides an opportunity for the vendor to accept or reject filling the order based on his or her inventory of available items, location at the venue, ability to fill the order by the desired delivery time, or a variety of other reasons such as the vendor's need to fix the dispenser 34 or the vendor indicating that he or she is presently off duty. If the vendor rejects the order, the order station may query other vendors to determine if the order can be filled by one or more of them. If the order can be fulfilled, then an order confirmation module 90 sends a corresponding message to the device 20. If the order cannot be fulfilled, whether because it has been rejected due to low inventory, lack of acceptance by vendors, or a credit denial, a rejection message is generated by the order confirmation module 90 and sent to the device 20. As should be understood, while most orders will be fulfilled by vendors serving the area containing the seating location 16, the system 10 provides the flexibility to direct orders of an attendee to vendors outside of the area in which the person is sitting and, thus, allows attendees to order products that are available from any of the vendors 32 at the venue. Accordingly, attendees are not limited to receiving in-seat service from vendors serving only the particular section in which a particular attendee is seated.

Figure 4:
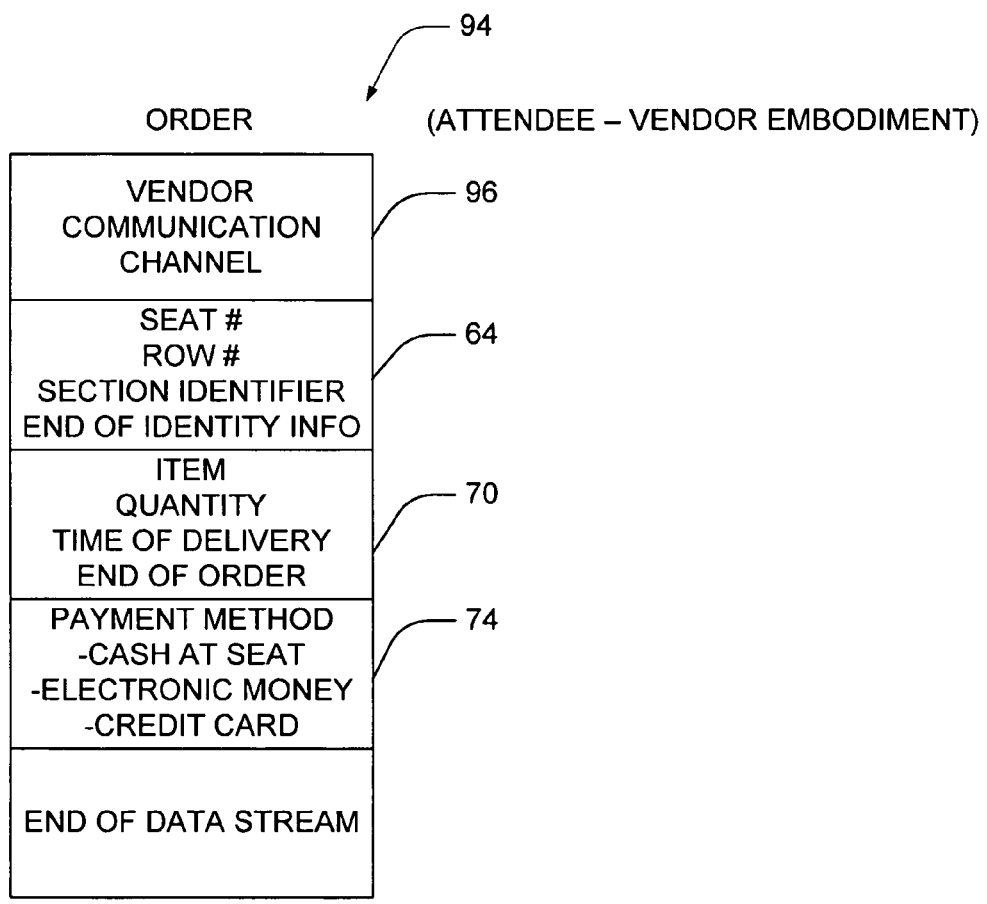
FIG. 4 is an illustration of the architecture of an order in a second embodiment of the invention.

As noted above, the invention does not require implementation with the order station 30. It is possible that the devices 20 and 36 communicate with each other over a wireless network, Internet communications that include wireless Internet access services, or other methods. FIG. 4 shows an order 94 that is similar to the order 60, but includes a vendor communication channel portion 96 that identifies the communication channel of the vendor having the items desired by the person 14 and included in the order 94. Order 94 is the type of order that is generated when the devices 20 and 36 communicate directly with each other.

Figure 5:
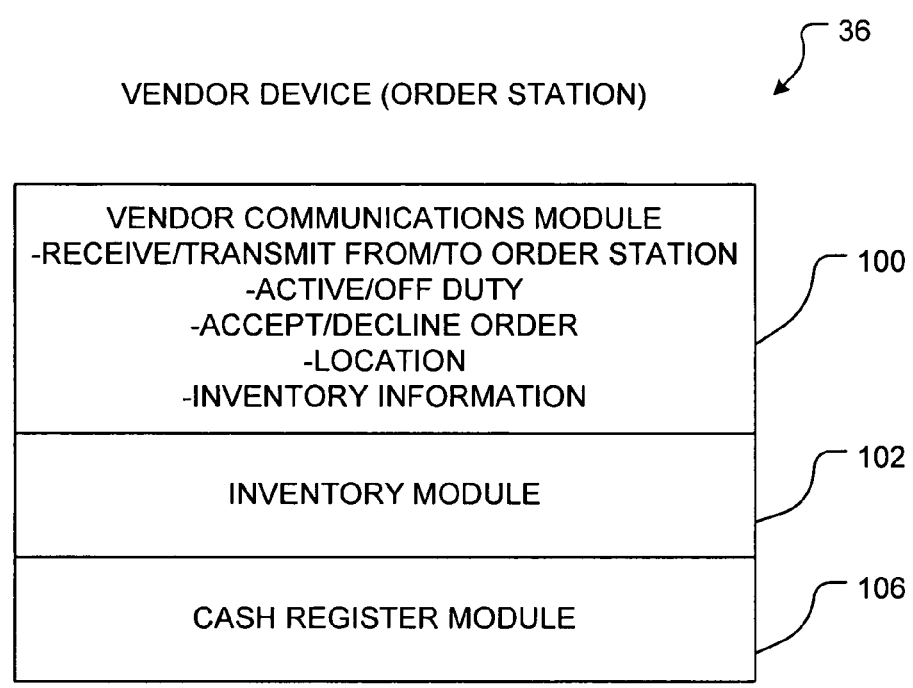
FIG. 5 is an illustration of the architecture of the vendor device in one embodiment of the invention.

FIG. 5 illustrates the architecture of the vendor device 36 when the device 36 is implemented in a system designed to operate with the order station 30. The vendor device 36 includes a communication module 100 that controls communication to and from the order station including sending messages such acceptance or rejection of an order, active or off-duty status, the location of the vendor, and inventory information regarding the number of items in the dispenser 34. The vendor device 36 may also include an inventory module 102 to internally track the number of items in the dispenser 34 and generate the inventory message or message component sent by the vendor communication module 100 to the order station 30. In addition, the vendor device 36 may include a cash register module 106 to generate a transaction interface to allow a vendor 32 to tally the amount of items sold when fulfilling an order, assist the vendor in making change, and track the sales of the vendor 32.

Figure 6:
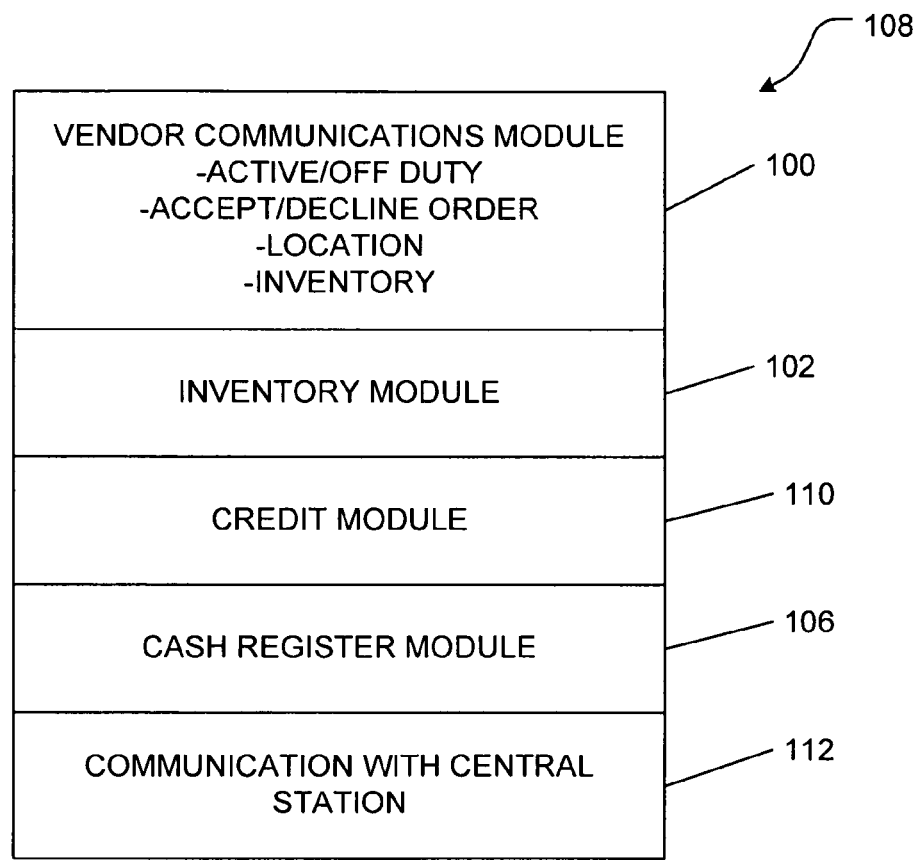
FIG. 6 is an illustration of the architecture of the vendor device in a second embodiment of the invention.

FIG. 6 illustrates an embodiment of the vendor device, a vendor device 108, that is useful when the invention is implemented without an order station 30. In addition to the components of the vendor device 36, the vendor device 108 includes a credit module 110 that can perform all or many of the functions performed by the credit module 82. The vendor device 108 also includes a communication module 112 to support communication or connection to a central download station (not shown). The communication module 112 may be incorporated in the vendor communication module or maintained separately. Either way, it supports communication or transfer of information from the device 108 to a central station such that the activity of a vendor as recorded on a device 108 may be stored or transferred to another computer system, such as is done when PDA's are docked and linked with other computers. As should be understood, in the embodiment shown in FIG. 6, the vendor communication module 100 is modified to communicate directly with the devices 20 of individual attendees, rather than the order station 30.

Figure 7:
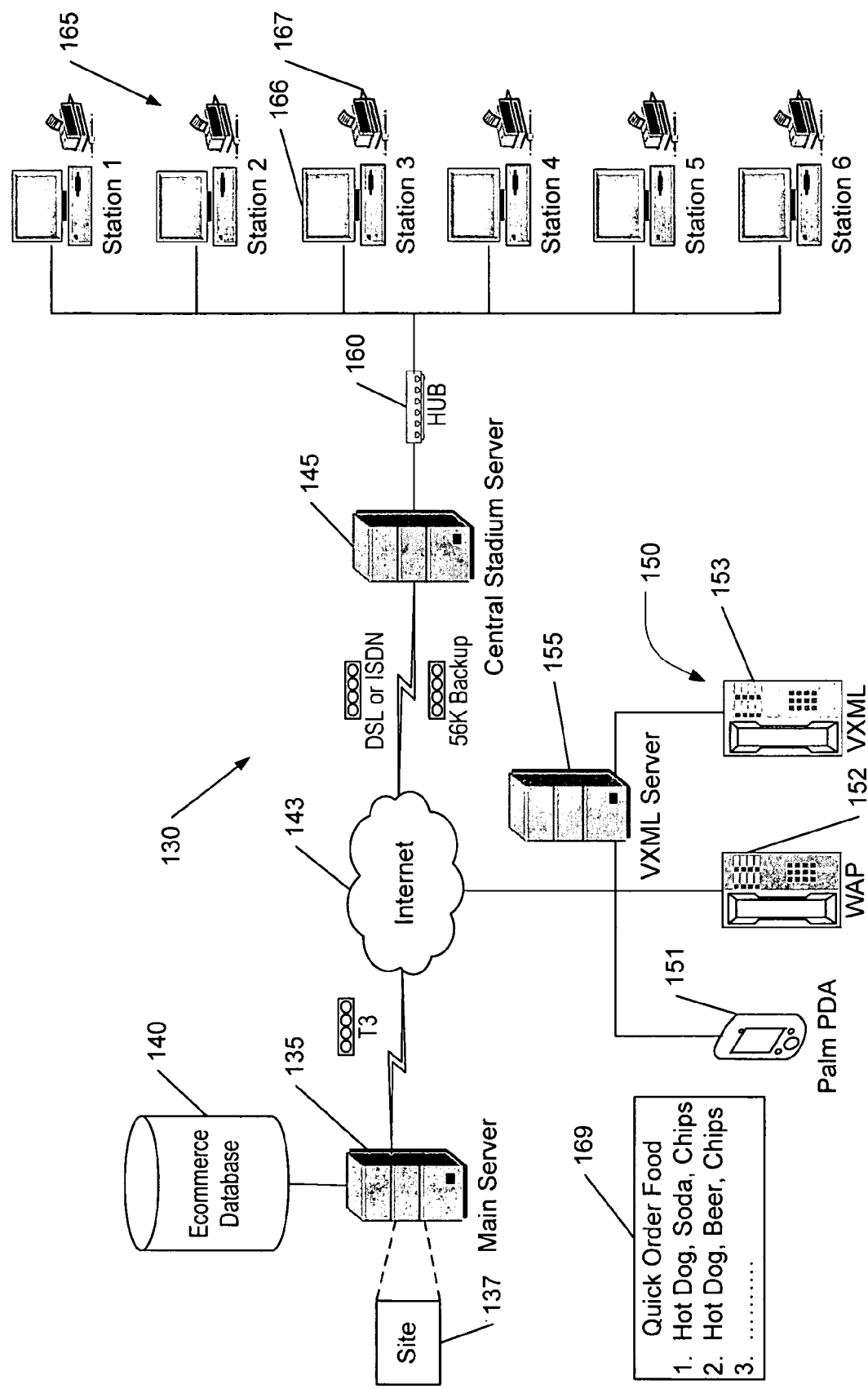
FIG. 7 is an illustration of a system of another embodiment of the invention.

FIG. 7 illustrates a system 130 of another embodiment of the invention. The system 130 includes a commerce server 135 which hosts a site 137 (described further below) and a database 140. The commerce server 135 may be an NT-based web server equipped with Windows 2000, Internet Information Server 4.0, and SQL 2000. In one embodiment of the invention, it is assumed that that the site 137 will be accessed by devices using Netscape Navigator 4.0+ or Microsoft's Internet Explorer 4.0+, or versions of the same. Preferably, all graphics on the site 137 are processed with Adobe's ImageReady for maximum compression and minimum visual distortion.

The database 140 includes information about users who have registered to electronically order items at venues. In a preferred embodiment, ActiveX Data Objects ("ADO") are used to provide access to the data stored in the database 140 from a variety of platforms.

The commerce server 135 communicates via a network 143 (such as the Internet) with a venue server 145 and communication devices 150, which may include a PDA 151, a network-enabled phone 152 (such as a wireless area protocol ("WAP") phone), and non-network-enabled phone 153 (such as a wireless cell phone over which voice commands may be transmitted to a voice command processor 155).

Communication devices suitable for use in the system 130 include Palm brand compatible PDAs where the menuing system is implemented utilizing web clipping, an HTML-like language that has been optimized for the low-bandwidth transactions. Palm VII/Palm VIIx devices with Palm.Net Service, Kyocera SmartPhones, Handspring Visors with the VisorPhone Accessory, and Palm V/Palm Vx devices with Omnisky Service are all devices that may be used in the invention.

Network-enabled phones, such as Internet-enabled phones, may also be used in the invention. Currently, there are two basic standards that can be used—handheld device markup language ("HDML") and wireless markup language ("WML"). WML is the standard in Europe and has made significant in-roads into the North American market. However, several large U.S. providers still only support HDML. The exact choice will depend on a variety of factors including the geographic location of the venue.

While hypertext or similar content interfaces are envisioned as the most common implementation of the invention, voice ordering is an alternative to the use of such technologies and is particularly suited for use with phones that are not network-enabled. Voice extensible markup language ("VXML") technology may be exploited to deploy menu-driven voice-recognition systems. The systems can be configured using commonly available scripting languages and to recognize spoken word responses or keypad entries. Application tool kits such as those available from BeVocal including the BeVocal Foundation Platform, which supports both VoiceXML 1.0 and Java, are suitable for use in the invention.

To access the site 137, a user with a non-network enabled phone dials a toll-free number. After entering a login and pin, the user is presented with a voice-activated menu of choices. Additionally, users have the option of using a pre-printed card 169 to select items by number in order to make a "quick order." Voice based orders are sent to the voice command processor 155, which converts the orders to a non-voice format and transmits the converted orders to the commerce server 135.

Of course, not all attendees at a venue may own a PDA, mobile phone, or other communication device. In this case, units that users can "check out" at the venue may be deployed at counters near the entrances to a venue or other locations. It is envisioned that PDA-like devices with limited functionality or PDAs that are locked down to provide only ordering functionality would be made available.

The venue server 145 may be coupled to a hub 160 to support communication with a plurality of vendor stations 165 (FIGS. 7 and 12) located at the venue. For purposes of description of the invention, six stations are shown, but more or less stations may be implemented. An exemplary vendor station suitable for use in the system 130 includes a Pentium II class workstation running at a minimum of 266 MHz and 32 Mbytes of RAM. Each vendor station may include a monitor 166 and a printer 167. The workstation may also include a keyboard and mouse (not shown). The monitor may be a touch screen display. Each vendor station is connected to the network 143 via a local area network or dedicated modem. Each vendor station makes queries to the database 140 on a periodic basis, such as every 15 seconds, to retrieve orders.

When an order is received by the workstation, it generates a sales ticket on its printer and displays the pending order on the monitor in a queue-like system. The time of the order is tracked and a timer shows the length of time the order remains unfulfilled. Vendors pick up the sales ticket and fulfill the order. When the order is ready for delivery, the vendors mark the order fulfilled. The vendor station then communicates the order status back to the main database 140. If an order remains unfulfilled for a certain length of time (e.g., ten minutes), the order is sent to every vendor station as an "URGENT" order request. The first station that can fulfill the order accepts responsibility for that order. When the order is fulfilled, the vendor station at which the "URGENT" order is filled broadcasts an order status and all vendor stations and the database 140 are updated.

Figure 17:
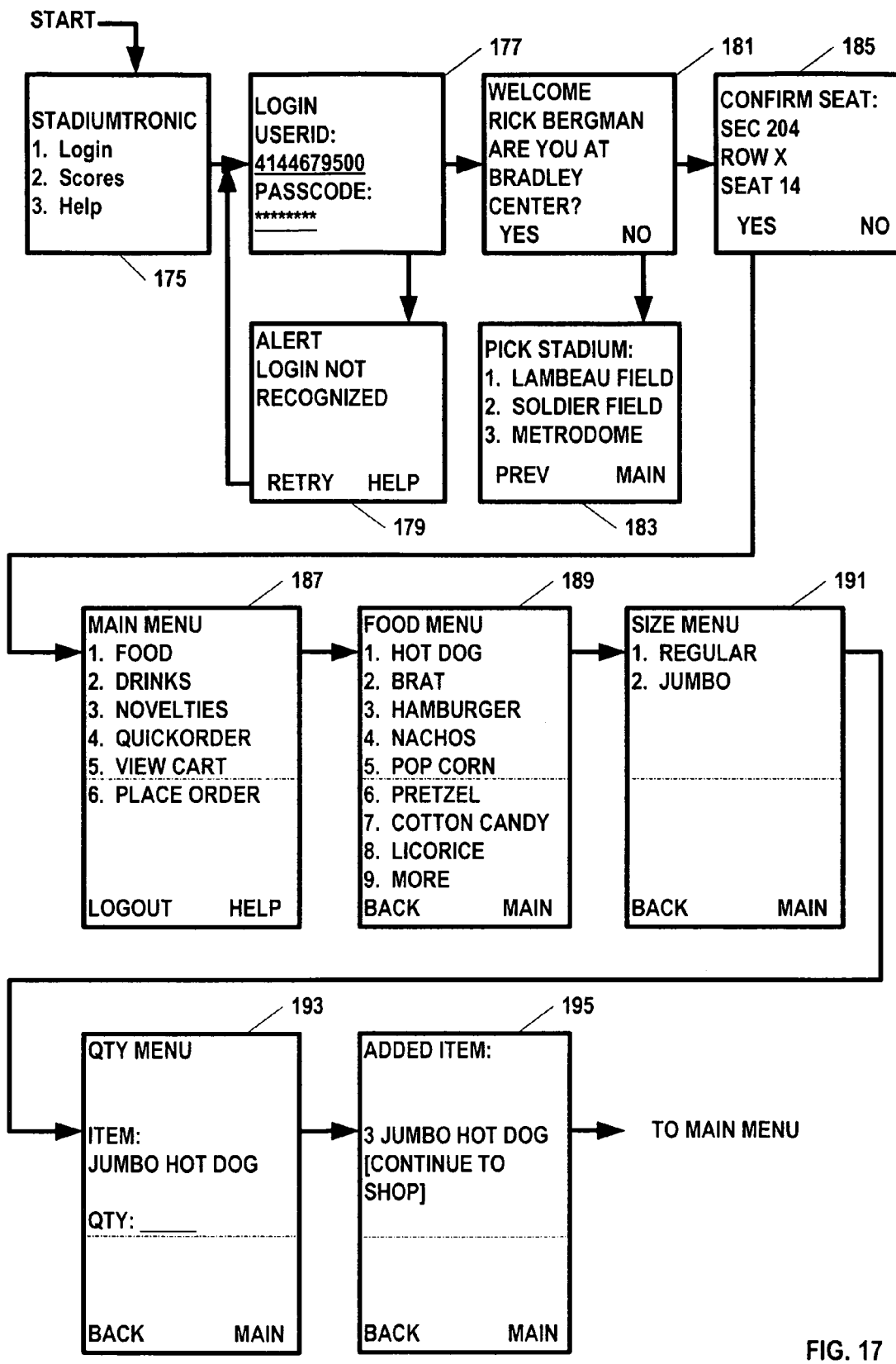
FIG. 17 is a block diagram depicting the overall operation of the system shown in FIG. 7.

In general terms, the operation of the system 130 is illustrated in FIG. 17 and is as follows. A user (i.e., a venue attendee) establishes an account on the site 137 hosted on the commerce server 135. In a preferred embodiment, the account requires a pre-paid balance. Alternatively, the user can supply a credit card or debit card number to demonstrate an ability to pay (credit and debit worthiness can then be checked using a variety of known services). Users can set their venues and default seating locations. For example, a season ticket holder can establish the stadium and seat location that he or she will have for a season. Users can also manage their account (adjust preferences, account balances, etc.) and review their order history (discussed below with respect to FIG. 15). Once an account is established the user is provided a user identifier or user ID and a password or similar security device.

Once at the venue, a user uses a device 150 to access the commerce site 130. The user may be provided several options including a "login" option, a "scores" option (to check scores of various sporting events through, for example, currently available services), or a "help" option, as shown at block 175. When the user first logs into the site 137, the site confirms the user's user ID and password, as shown at block 177. If the user ID or password is not recognized, the user is so notified and asked to re-enter the login information, as shown at block 179. If the user ID and password are recognized, the user is queried about which venue they are located, as shown at block 181 and 183. The system then confirms the location and seat of the user before allowing the user to make any orders, as shown at block 185. Current menu choices are made available to the user, as shown in blocks 187–195. The user makes selections and then authorizes the order.

As noted above, the vendor stations 165 query the site 137 on a periodic basis to download new orders. Orders appear on the appropriate order station (according, for example, to the section or area a user is seated). A paper order ticket is generated and vendors trained in the use of the order station fulfill the order from inventory available at the station. When the vendor leaves to deliver an order, the vendor marks the order as fulfilled. Orders are delivered to the seat location on the sales ticket.

Figure 8:
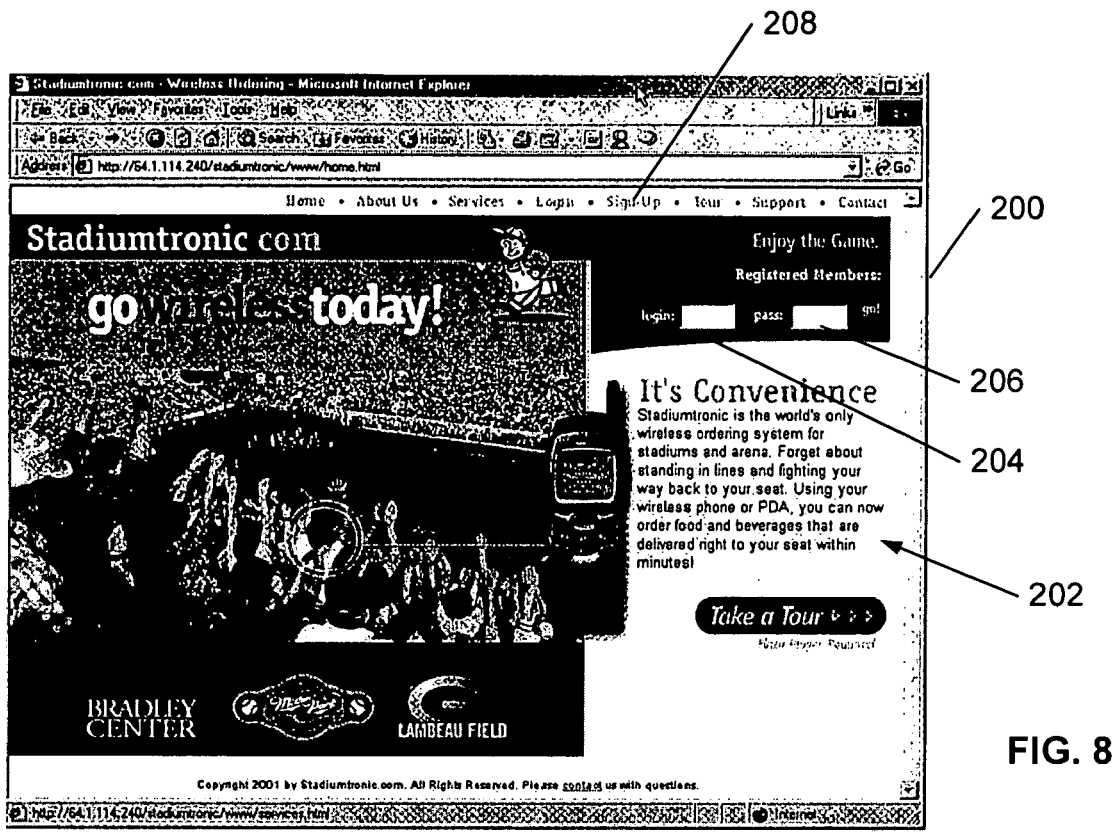
FIG. 8 is an illustration of an exemplary content page from a site of the invention.
Figure 9:
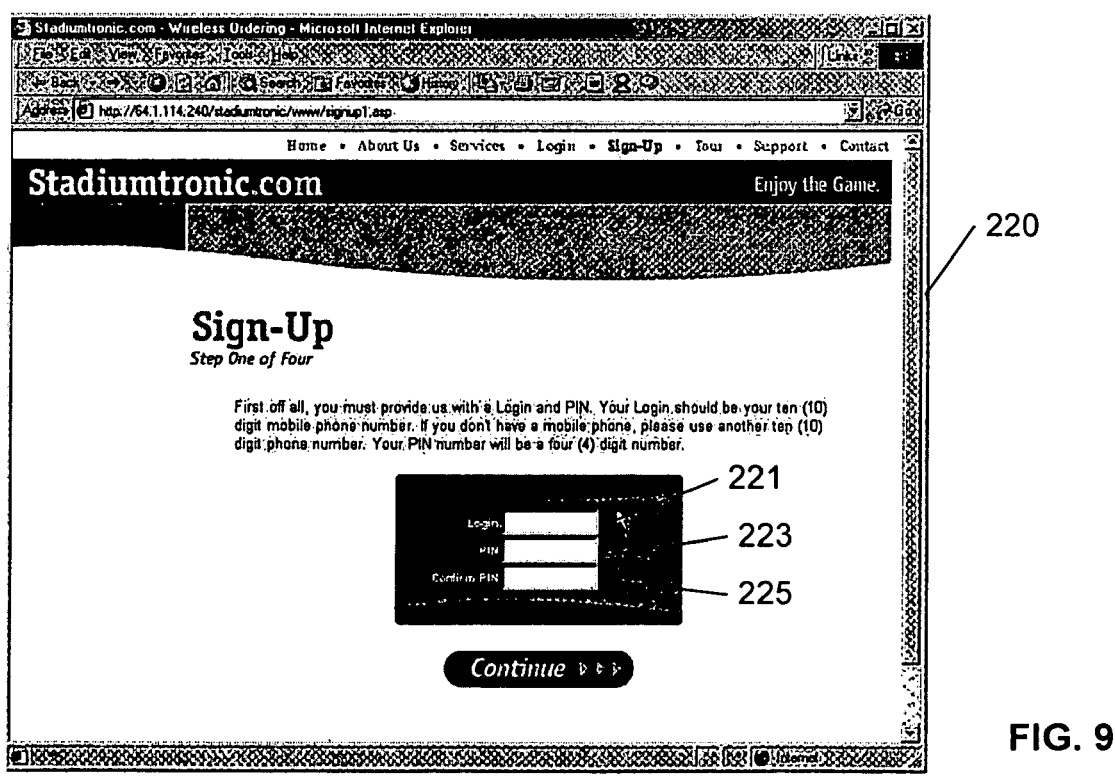
FIG. 9 is an illustration of another exemplary content page from a site of the invention.

FIG. 8 illustrates an exemplary home or front page 200 of the site 137. The page 200 includes explanatory content 202 and dialog boxes 204 and 206 for a registered user to enter a user ID or login and a password. The page 200 also includes a signup link 208. The signup link 208 is coupled to a signup page 220 (FIG. 9).

The signup page 220 includes dialog boxes for a new user to enter a user ID, a password, and a confirmation of the password. In one embodiment, the system 130 is configured to ask users for a 10-digit mobile phone number as a user ID. In case a mobile phone number is not available (such as when the user uses a communication device made available at the venue), the user can provide a home or work phone number. The password may take the form of a personal identification number ("PIN"). In such an implementation, the PIN may be a 4-digit number.

Once the user has selected a login and password, he or she is passed to another page 231 (FIG. 14) to enter personal information such as name, address, phone, and email information. The user also enters billing information on the page 231 or a sub-page 232. The user selects an amount of money he or she wishes to deposit in his or her account and provides credit card, debit card, or other payment information. On the same page 230, or a sub-page 233 the user selects venues that he or she wishes to attend. The information is transmitted (e.g., pushed) to a user administration module 234 using a secure transmission protocol such as secure socket layer ("SSL") transmission to the commerce server 135. In one embodiment, the database 140 retains all the information entered by the user. Alternatively, credit card or similar information need not be stored and automatic charge authorization can be conducted at the time a transaction occurs.

Figure 10:
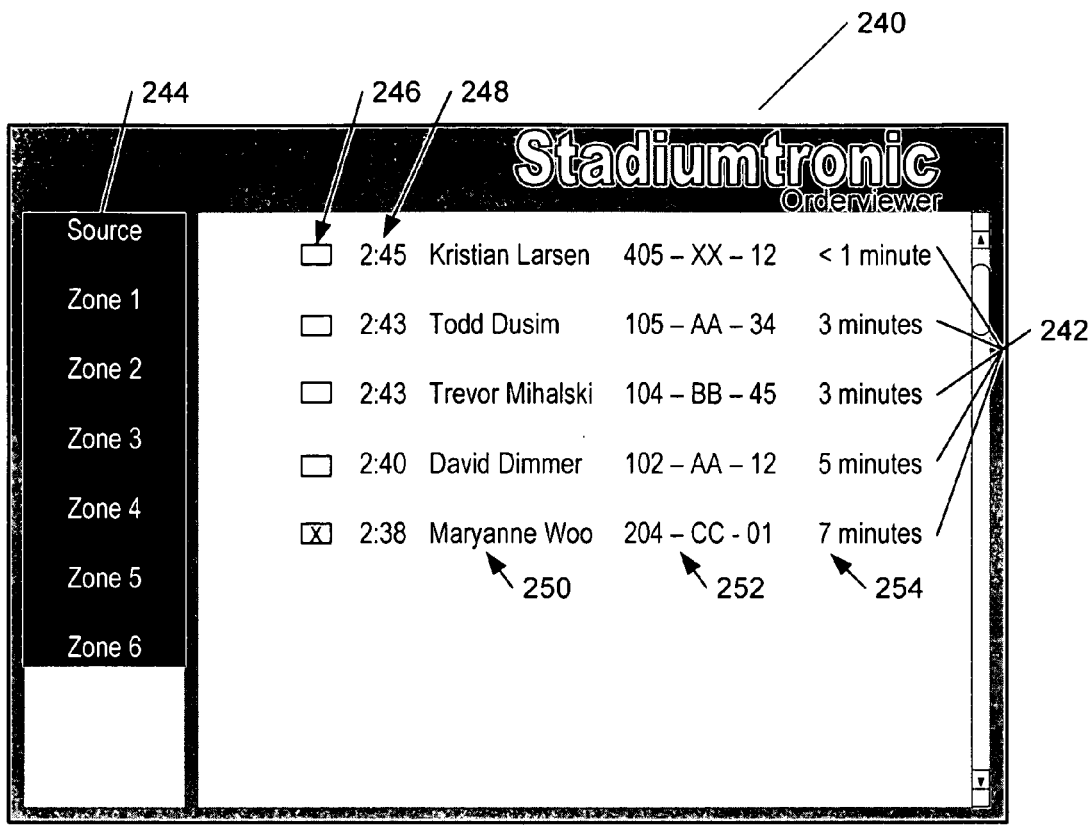
FIG. 10 is an illustration of an exemplary interface for an order viewer of the invention.
Figure 11:
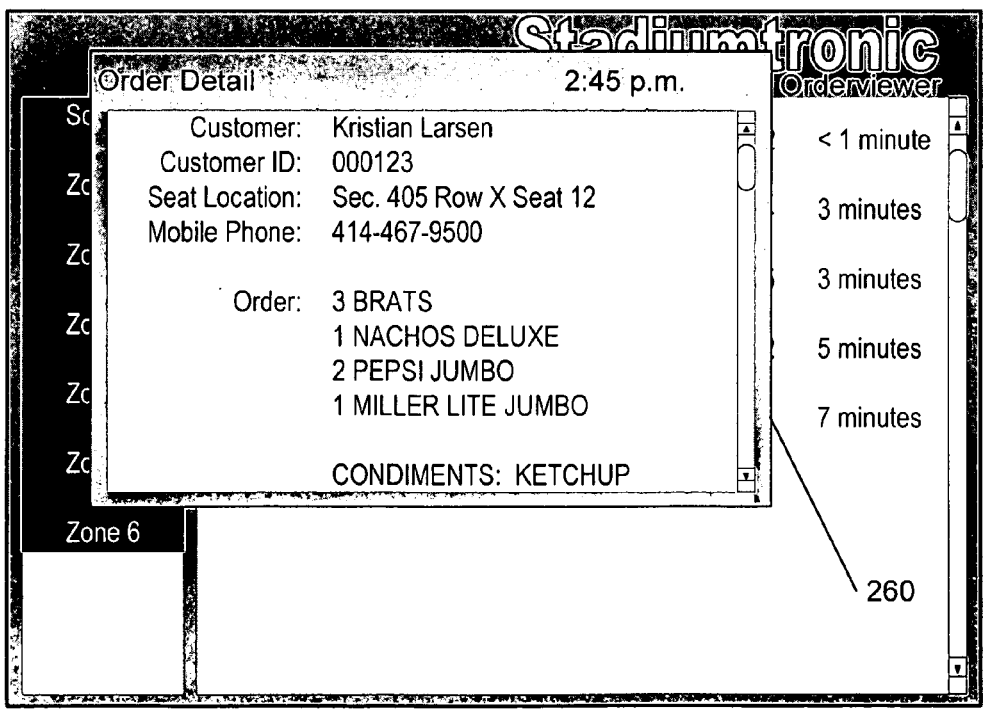
FIG. 11 is an illustration of an exemplary order detail interface for an order viewer of the invention.
Figure 12:
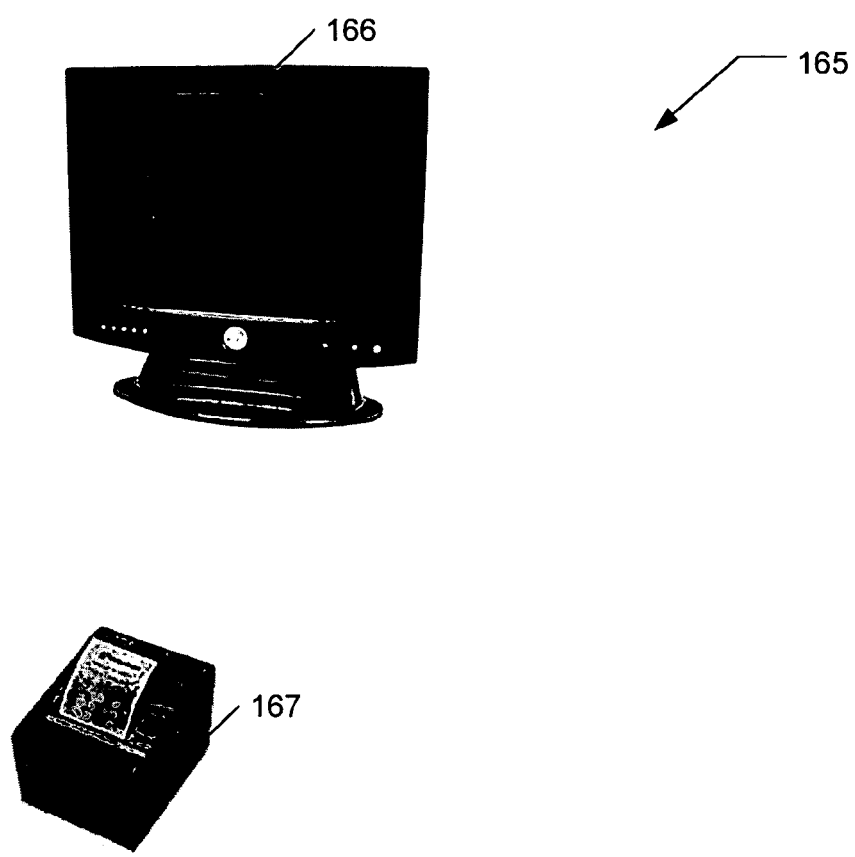
FIG. 12 is a perspective view of an exemplary display and printer at a vendor station.

FIG. 10 illustrates an order page or interface 240 displayed on the monitor 166. The interface 240 includes a plurality of orders 242. A source indicator 244 provides a visual indication of the area or zone of the venue that corresponds to the seating location of the attendee or user making the order. Each order 242 includes a checkbox 246 (to show whether the order has been fulfilled), a time of order indicator 248, a user name 250, a seat location 252, and a timer display 254, which indicates the number of minutes since the order has been placed by the user.

Vendors at a venue station may view details of an order on an order detail window 260 (FIG. 11) by highlighting or selecting an order of interest. The order detail window includes the user's name, an optional customer identifier, a location, a user ID (in this case, a telephone number), and specific information concerning the user's order.

Figure 13:
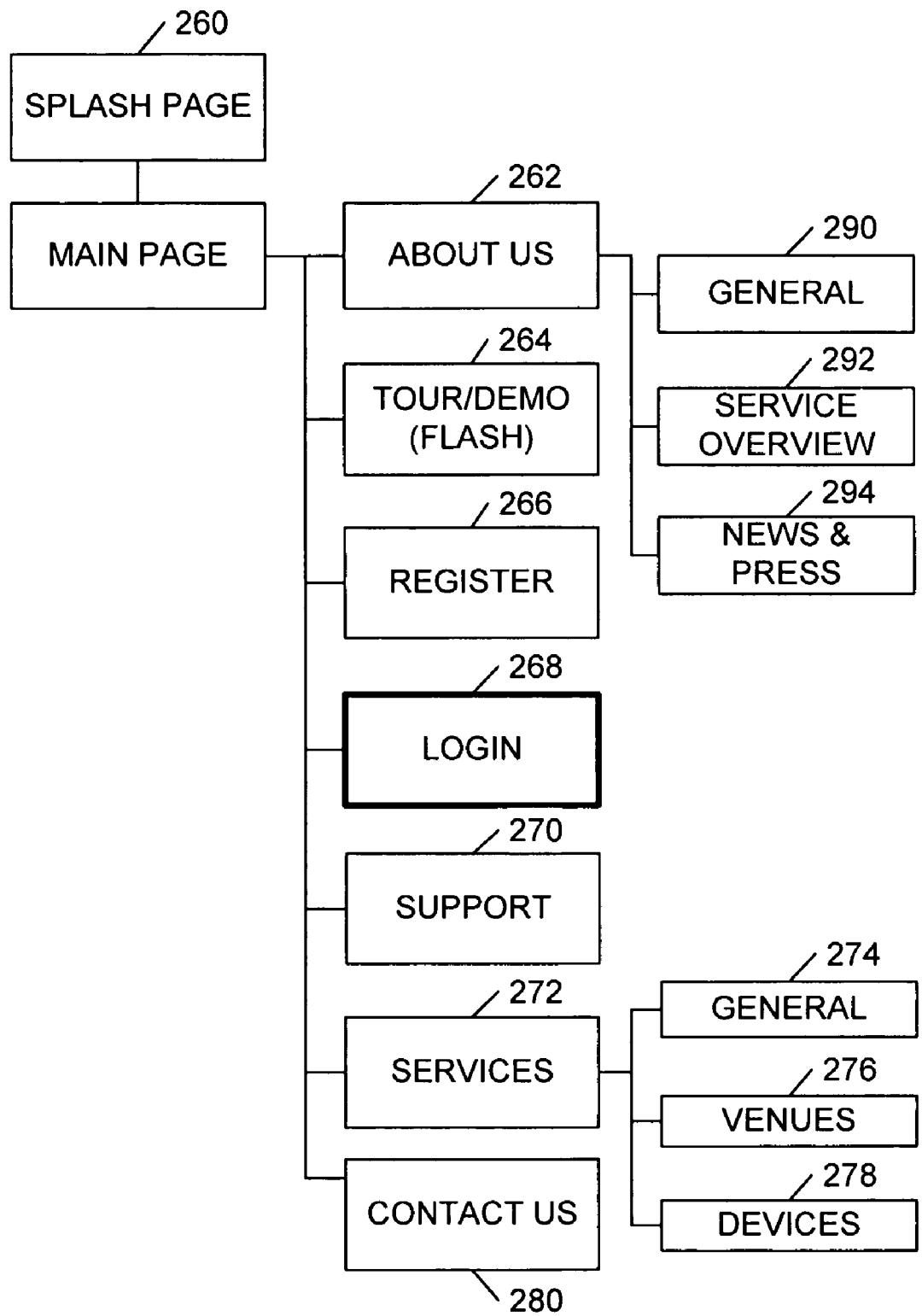
FIG. 13 is a block diagram of the content architecture for a site of the invention.
Figure 14:
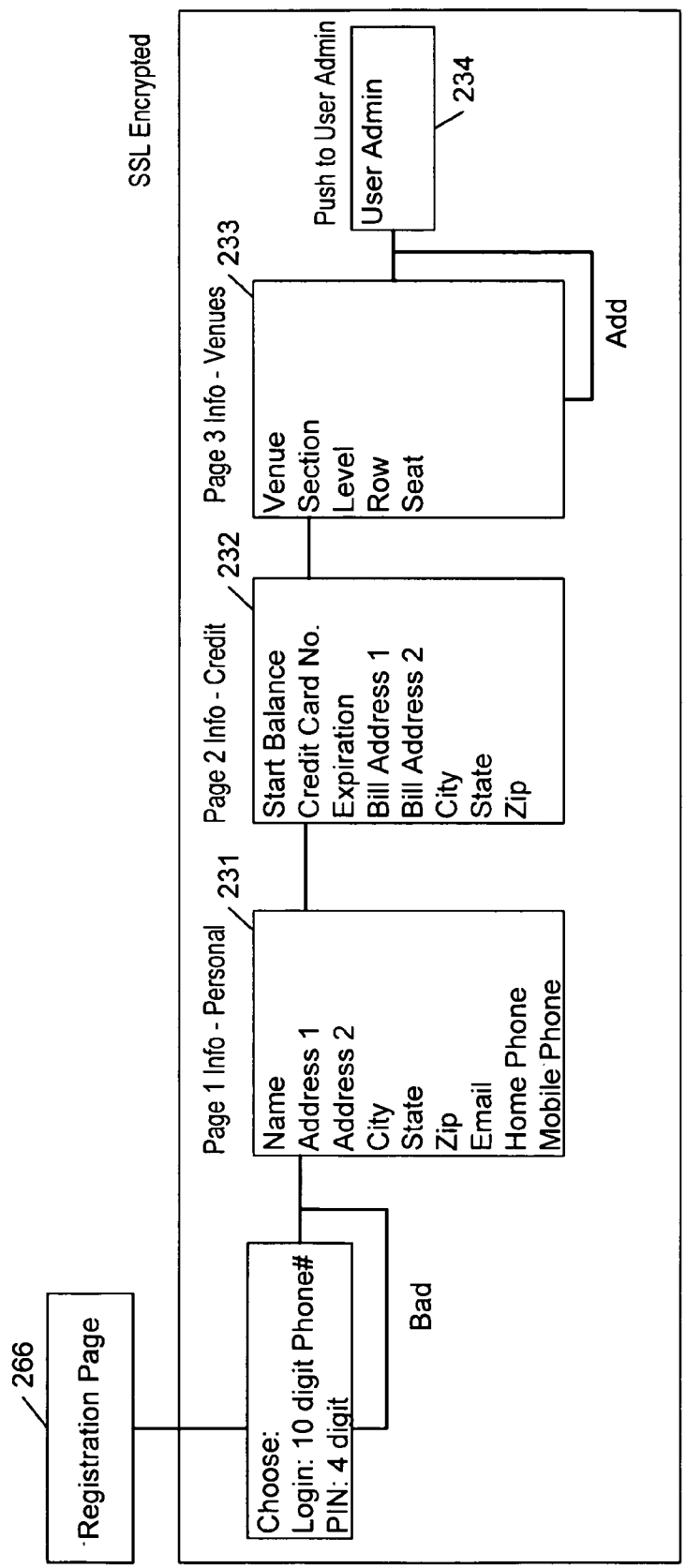
FIG. 14 is a block diagram of a login page for a site of the invention.

FIG. 13 illustrates the architecture of the site 137. The site 137 may include a splash page 260 and a front or main page (such as the main page 200). The site 137 may also include an "about us" page 262, a tour page 264, a registration page 266, a login page 268, a support page 270, and a services page 272. The services page 272 may include a general section 274, a venues section 276, and a devices section 278. The site 137 may also include a "contact us" page 280. The "about us" page 262 may include a general section 290, a service overview section 292, and a news and press release section 294.

Figure 15:
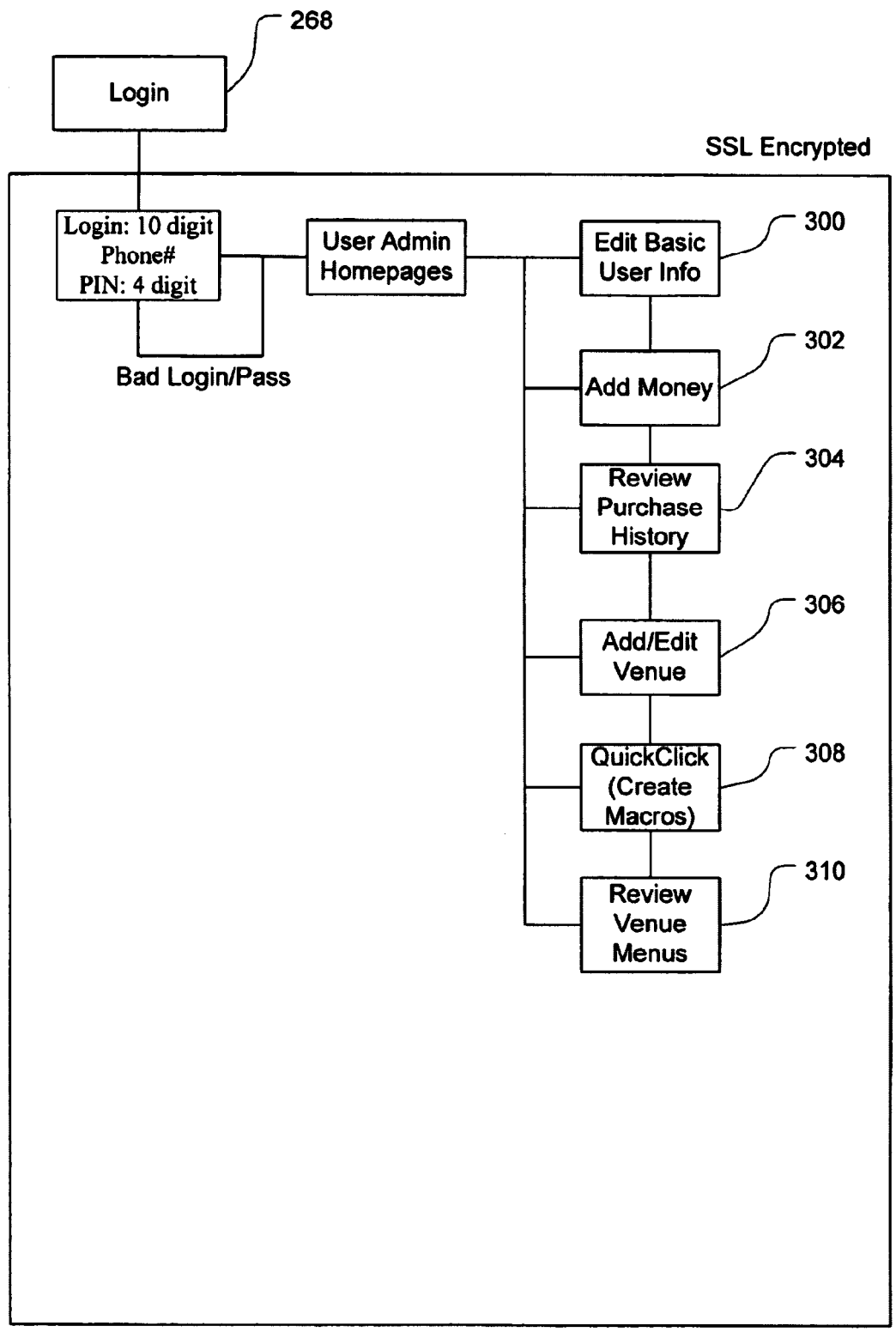
FIG. 15 is a block diagram of user account management pages for a site of the invention.

FIG. 15 illustrates a number of user account management pages. The pages includes a user information editing page 300, an "add money" page 302, a purchase history page 304, an edit venue page 306, a macro page 308, and a menu review page 310. The page 300 allows a user to edit his or for her basic user information such as name, address, telephone number, and the like. The "add money" page 302 allows a user to add money to his or her account. The purchase history page 304 allows the user to review his or her purchase history of orders made using the system 130. The edit venue page 306 allows a user to modify or add venues which he or she will attend. The macro page 308 allows a user to create software macros to provide quick ordering of commonly ordered items. The menu review page 310 allows a user to view the menus of various venues.

Figure 16:
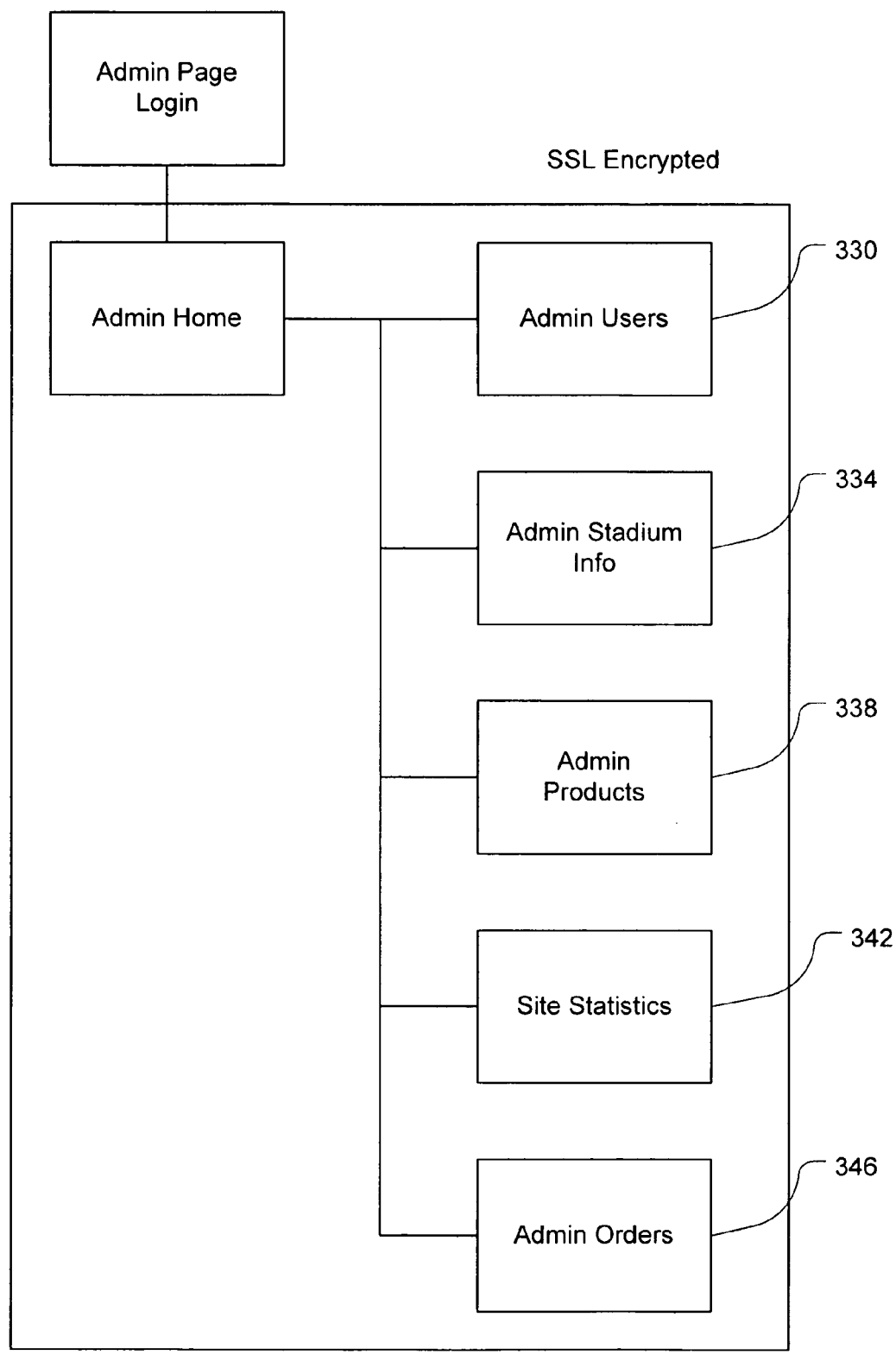
FIG. 16 is a block diagram of an administrator page for a site of the invention.

FIG. 16 illustrates the architecture of system administrator pages for the system 130. The system administrator pages includes a user page 330, a stadium information page 334, a product page 338, a statistics page 342, and an orders page 346. Each page allows an administrator to perform the functions associated with the name of each page.

As can be seen from the above, the invention provides a method and system of ordering and selling products at a venue.

Various features and advantages of the invention are set forth in the following claims.

What is claimed is:

1. A system for ordering items available at a venue by a venue attendee, the system comprising:
   a display board displaying instructions to attendees on how to place an order, the display board being simultaneously viewed by multiple venue attendees at the venue;
   a wireless device for generating an order of an item based on the instructions displayed on said display board and transmitting said order via a network, said order having a location identification information within said venue, a desired delivery time, and a payment option;
   a first roaming vendor communication device within said venue, said vendor communication device having a unique communication channel;
   an order station having a unique communication channel and receiving said order from said wireless device via said network, said order station performing a credit check on said payment option and if credit check is positive transmitting said order to said first roaming vendor communication device based on said location identification information; and
   a second roaming vendor communication device within said venue having a unique communication channel and receiving said order from said order station in the event the first roaming vendor communication device communicates a response indicating a rejection of the order, said second roaming vendor communication device configured to communicate one of an acceptance or rejection of the order to said order station,
   wherein said order station communicates an acceptance or rejection of said order to said wireless device, and if accepted, the order is delivered to a location based on said location identification information.

2. A system as claimed in claim 1, wherein the display board is selected from the group consisting of a scoreboard and a stadium TV.

3. A system as claimed in claim 1, wherein the site is a web site and the signal indicative of instructions to attendees on how to place an order via the wireless communication device includes information sufficient for the display board to display the web site.

4. A system as claimed in claim 1, wherein the signal indicative of instructions to attendees on how to generate an order via the wireless communication device includes information sufficient for the display board to display an order card.

5. A system as claimed in claim 1, wherein the site includes a signup page.

6. A system as claimed in claim 1, wherein the site includes a one or more user account management pages.

7. A system as claimed in claim 1, wherein the site includes one or more system administrator pages.

8. A system as claimed in claim 1, wherein the at least one vendor station is configured to generate an order interface displayable on the at least vendor station, the order interface including an indicator to show whether an order has been fulfilled and a source indicator.

9. A system as claimed in claim 8, wherein the order interface further includes a time of order indicator, a seat location, and a timer display.

10. A system as claimed in claim 8, wherein the order interface further includes an order detail window.

11. A system as claimed in claim 1, wherein the at least one vendor station includes a printer.

12. A system as claimed in claim 1, further comprising a voice command processor to process voice-based orders.

* * * * *